United States Patent
Florentz

(10) Patent No.: US 9,251,418 B2
(45) Date of Patent: Feb. 2, 2016

(54) METHOD OF DETECTION OF POINTS OF INTEREST IN A DIGITAL IMAGE

(71) Applicant: PARROT, Paris (FR)

(72) Inventor: Gaspard Florentz, Paris (FR)

(73) Assignee: Parrot, Paris (FR)

( * ) Notice: Subject to any disclaimer, the term of this patent is extended or adjusted under 35 U.S.C. 154(b) by 0 days.

(21) Appl. No.: 14/661,794

(22) Filed: Mar. 18, 2015

(65) Prior Publication Data

US 2015/0294152 A1   Oct. 15, 2015

(30) Foreign Application Priority Data

Apr. 9, 2014 (FR) ..................... 14 53161

(51) Int. Cl.
*G06K 9/00* (2006.01)
*G06K 9/46* (2006.01)

(52) U.S. Cl.
CPC .......... *G06K 9/00624* (2013.01); *G06K 9/4604* (2013.01)

(58) Field of Classification Search
None
See application file for complete search history.

(56) References Cited

U.S. PATENT DOCUMENTS

2013/0279813 A1   10/2013   Pau et al.

OTHER PUBLICATIONS

Khan, Muhammad Altamash, "Characterization of Surf Interest Point Distribution for Visual Processing in Sensor Networks", 2013IEEE.
Gioachino Vino et al., "Revisiting Harris Corner Detector Algorithm: A Gradual Thresholding Approach", Springer-Verlag Berlin Heidelberg 2013, p. 354-363.
Albert S. Huang et al., "Visual Odometry and Mapping for Autonomous Flight Using an RGB-D Camera", Int. Symposium on Robotics Research, Aug. 28, 2011.
Cordelia Schmid et al., "Evaluation of Interest Point Detectors", International Journal of Computer Vision 37(2), XP008032572, pp. 151-172.

*Primary Examiner* — Atiba O Fitzpatrick
(74) *Attorney, Agent, or Firm* — Haverstock & Owens LLP

(57) ABSTRACT

A camera (10) produces a sequence of images (12) processed by a point of interest search algorithm (14) that is parameterizable with a detection threshold ($\tau$) such that the number (N) of points of interest detected in the image varies as a function of the threshold level. The characteristic giving the number (N) of detected points of interest as a function of the threshold ($\tau$) is modelled by a square root decreasing exponential function, which is dynamically parameterizable with values linked to the image to be analyzed. The method comprises the steps of: a) determining (18) values of parameterization of the decreasing exponential function for the current image; b) predicting (18), for this current image, an optimum value of the threshold by using the modelled characteristic, parameterized with the values determined at step a); and c) applying (14), for at least one later image, the point of interest search algorithm with the optimum threshold value ($\tau$) computed at step b).

13 Claims, 7 Drawing Sheets

METHOD OF DETECTION OF POINTS OF INTEREST IN A DIGITAL IMAGE

The invention relates to the processing of digital images, and more precisely the detection in such an image of "points of interest" or "corners", in particular for processings intended for robotic and computer vision systems.

The "corners", "points of interest" or "landmarks" are small-dimension elements of an image that have characteristics of invariance allowing in particular to recognize them from one image to the following one.

The analysis of the displacements of the points of interest in the image is used by various algorithms of shape recognition, of analysis of the camera displacements, of reconstruction of a two-dimension or three-dimension space, etc.

The basic idea is that a point of interest detected in an image often remains a point of interest in the following images, so that the analysis of the dynamic variations of the image is hence reduced to the analysis of the changes of position of the points of interest, i.e. an analysis of an evolving list of points of interest to extract pertinent descriptors therefrom.

A satisfying detection of the points of interest in the image is hence an essential prerequisite to any processing of this type, the detection algorithm used having to be also robust and economical in computation resources if it has to be implemented "on the fly" by an on-board system, with recognition of the points of interest and extraction of the descriptors in real or quasi-real time.

Various algorithms of detection of points of interest have been proposed, among which can be mentioned in particular the FAST (Features from Accelerated Segment Test), SURF (Speeded-Up Robust Features) or SIFT (Scale-Invariant Feature Transform) algorithms.

The FAST algorithm is described in particular by:
[1] E. Rosten, R. Porter, and T. Drummond, "Faster and Better: A Machine Learning Approach to Corner Detection", *IEEE Trans. Pattern Analysis and Machine Intelligence*, Vol. 32, pp. 105-119, 2010.

A sophisticated version of such a FAST algorithm is described in the WO 2013/055448 A1, which describes a method allowing to detect and classify efficiently the points of interest in a digital image.

For the SIFT algorithm, reference can be made, for example, to:
[2] D. G. Lowe, "Distinctive Image Features from Scale-Invariant Key-points", *Int. J. Comput. Vision*, Vol. 60, No. 2, pp. 91-110, November 2004.

And for the SURF algorithm, to:
[3] H. Bay, A. Ess, T. Tuytelaars, and L. J. V. Gool, "Speeded-up Robust Features (SURF)", *Computer Vision and Image Understanding*, Vol. 110, No. 3, pp. 346-359, 2008, and
[4] M. A. Khan, G. Dan and V. Fodor, "Characterization of SURF Interest Point Distribution for Visual Processing in Sensor Networks", 18*th International Conference on Digital Signal Processing* (*DSP*), 2013, pp. 1-7.

These algorithms are all parameterizable with a data element called "detection threshold", which conditions the sensitivity of detection the points of interest.

Essentially, the current image is scanned pixel per pixel and the algorithm determines whether, for each analysed pixel of the image, a score that is a function of predefined criteria is higher or not than the detection threshold parameterized at the input. According to whether the score is located above or under this threshold, it is considered that the point is, or not, a point of interest in the image.

From then one, with a low detection threshold, the algorithm provides a high number of points of interest—but with the risk to deliver many useless points of interest, which won't be recognised in the following images and which will then be penalizing in terms of computation power used. Conversely, a high detection threshold allows to eliminate many non-pertinent points of interest, which have not the desired characteristic of invariance from one image to the following one, but with the risk of not detecting certain useful points of interest, for example in regions of the image having an insufficient contrast, a too uniform texture, etc. An insufficient number of points of interest may also have a negative impact on the results of the processings performed downstream.

In this respect, it may be referred to the above-mentioned article [4] of Khan et al., which presents a statistical study of the distribution of the number of points of interest as a function of the detection threshold.

The object of the invention is to improve the performances of such algorithms of detection of points of interest, by dynamically modifying their parameterization, but without changing the inner operation.

The invention will then be applicable to a very great number of algorithms of detection of points of interest, especially to an algorithm of the FAST type for which it will provide particularly significant advantages. But this application to a FAST algorithm is not limitative in any way, the invention being applicable to other types of algorithms from the moment that these latter can be parameterized with an adjustable detection threshold, as in the case in particular of the SURF and SIFT algorithms.

The basic idea of the invention is to perform, upstream of the detection of points of interest itself, a previous analysis of the current image, and to dynamically determine, as a function of the result of this analysis, the value of the detection threshold that will be used for the detection of the points of interest of the following image.

In other words, the detection threshold will no longer be a fixed parameter, empirically adjusted or possibly modified by a feedback loop, but an input data element of the detection algorithm that is dynamically modifiable at each image, so as to adapt at best the response of the detection algorithm as a function of the rapid variations of the image of the scene picked up by the camera.

The technique of the invention aims in particular to keep the number of points of interest detected by the algorithm at a substantially constant level, chosen a priori as being optimal, and this even in presence of a very changing scene.

A typical example of changing scene is that picked-up by a camera on-board an automotive, which delivers video sequences showing very significant and very fast variations both of the content of the image and of the brightness and contrast thereof, as a function of the presence or not of buildings on the side of the road, of the aspect of these buildings, of the passage in tunnels or under bridges, of the dazzle by a vehicle coming in the reverse direction, etc.

In this respect, the invention aims to solve two specific problems met with most of the detectors of points of interest:
the first problem is the time instability: with an heterogeneous video sequence, the algorithm detects points of interest in very variable number from one image to another, as a function of the characteristics of contrast, texture, illumination, etc., of the images. Concretely, and according to the images of the sequence, there may be a high, or even excessive, number of points of interest, which will have been very penalizing in terms of computation resources used for the analysis of this image, or reversely a too low number of points of interest, leading to a degradation of the performances for the processings operated downstream of the detector of points of interest;

the second problem is the space instability: even if, generally, an image contains a sufficiently high and substantially constant number of detected points of interest, the detections may be distributed in an very unequal manner, with very few points of interest in certain regions of the image and a lot in other regions, which will have the same negative impacts as hereinabove as regards the performances of the downstream processings.

A solution consists in using a fixed detection threshold, low enough to generate an acceptable number of points of interest in any circumstances, in particular in low-contrast scenes. If the number of detections is excessive, a filtering of the supernumerary points of interest as a function of their degree of pertinence is then carried out.

However, this solution involves a high cost in terms of computation resources, due to the increased time of processing, the FAST algorithm being especially affected by this phenomenon in case a too low threshold is chosen. Moreover, although this solution allows to stabilize the output data in terms of number of points of interest, it is not fundamentally an adaptive method.

Another way to proceed consists in varying the threshold by providing a simple proportional feedback loop between the current detections and the desired result, as described in particular by:

[5] A. Huang, N. Roy, A. Bachrach, P. Henry, M. Krainin, D. Maturana, and D. Fox, "Visual Odometry and Mapping for Autonomous Flight using an RGB-D Camera", *Proc. of the International Symposium of Robotics Research* (*ISRR*), 2011.

A technique of same nature is described by the US 2013/0279813 A1, where the threshold is dynamically adjusted so as to detect a constant number of points of interest in the successive images. The solution proposed by this document is based on a target number of points of interest to be detected in sub-regions of the image, a number possibly weighted by the values of recognition rate computed for these sub-regions.

Although these solutions have a character of adaptability to the content of the image, they have tow serious limitations:

firstly, they do not allow to make up for the sudden variations of the image, neither in terms of content of the scene nor in terms of whole brightness (for example, at the time of entry into or exit from a tunnel). Moreover, the systems for automatic correction of camera exposure tend to aggravate this problem, insofar as these systems suppose a linear response of the sensor and are also based on the mean statistics of the image, which do not reflect the reality of the scene variations;

secondly, to operate the feedback, these systems presuppose a linearity between the detection threshold and the number of points of interest detected by the algorithm, which is a simplifying hypothesis that does not lead, concretely, to really satisfying results with regard to heterogeneous sequences of images.

The invention proposes a new technique of detection of points of interest allowing to make up for the above-mentioned drawbacks by dynamically adjusting, in an accurate and efficient manner, the detection threshold of the algorithm.

The invention provides in particular the following advantages:

regulation of the detection computation time, which remains substantially constant for one image, even in presence of very heterogeneous sequences of images;

decrease and stabilisation of the average computation time of the algorithm downstream of the point of interest detector (algorithm of camera displacement analysis, of cartography . . . ), insofar as this algorithm will process a substantially constant number of input points of interest;

automatic adaptation to the complexity of the scene, allowing in particular to keep a sufficient number of detected points of interest when the scene is less textured (the typical example being the passage through a tunnel in a car);

increase of the rate of pertinent points of interest, i.e. of points of interest that can be recognised from one image to the following one: indeed, the points of interest detected by the algorithm according to the invention are on average substantially better from this point of view, so that the later computation operations will be able to be executed more efficiently and more rapidly;

excellent distribution of the points of interest in the different areas of the image, also leading to a better efficiency of the algorithms downstream the detection;

simplicity of adjustment of the desired optimum number of points of interest, allowing an easy porting of the algorithm from one platform to another and an adaptation for different versions (for example, business version and family version).

The starting point of the invention is the observation that, for any image and whatever the scale at which this image is considered (fine or rough), the characteristic giving the number N of detected points of interest for a given detection threshold τ (brought back to a pixel-homogeneous quantity) is well represented by a decreasing exponential function, in particular a square root decreasing exponential function of the type:

$$N(\tau) = C\exp\left\{-\sqrt{\frac{\tau}{\sigma}}\right\}$$

where C and σ are parameters linked to the current image.

Insofar as such a function requires only the determination of two parameters (C and σ), such a model will be very fast to compute, because two iterations of the detection algorithm, for two different threshold values τ, will be sufficient, with the advantage that the second iteration will be able to be applied to only the points of interest selected by the first iteration, hence in a still faster manner.

Once the so-determined parameters of the exponential model N(τ), this model will be able to be used at the following image to determine the threshold τ to be applied to the detection algorithm, as a function of the number N of points of interest fixed a priori and considered as being optimum.

It will be noted that the approach of the invention, which consists in choosing a priori a number of points of interest that the algorithm must deliver and to determine, as a function of this number, the detection threshold to be applied, is opposite to the conventional approach, which consists in fixing a priori the detection threshold τ (potentially adjusted by a feedback loop), and to collect at the output a number N of points of interest, a number that may vary in significant proportions if the sequence of images is particularly heterogeneous.

The technique of the invention may be implemented in various manners that will be described in more detail hereinafter, allowing in particular to reduce in very significant proportions the above-mentioned phenomena of time instability and space instability of the point of interest detection. It will also be seen that these particular implementations can be operated without substantial increase of the computation resources and the processing time, hence in an almost "free" manner in terms of cost of processing.

More precisely, the invention proposes a method of detection of points of interest in a digital image of a sequence of images of a scene picked up by a camera. This method implements, in a manner known per se, a point of interest search algorithm that is parameterizable with a detection threshold such that the number of points of interest detected in the image varies as a function of the threshold level.

This method provides, according to the invention, the modeling by a decreasing exponential function of the characteristic giving the number of detected points of interest as a function of the threshold, this exponential function being dynamically parameterizable with values linked to an image to be analysed. The method comprises steps of:

a) determining, for a current image, values of parameterization of the decreasing exponential function;
b) predicting, for said current image, an optimum value of the detection threshold by using the modelled characteristic, parameterized with the values determined at step a); and
c) applying, for at least one image following said current image, the point of interest search algorithm with the optimum detection threshold value computed at step b).

The optimum detection threshold value predicted at step b) can be in particular a value corresponding to a given number of points of interest, as indicated by said characteristic giving the number of points of interest detected as a function of the threshold.

Very advantageously, the decreasing exponential function is a square root decreasing exponential function:

$$N(\tau) = C\exp\left\{-\sqrt{\frac{\tau}{\sigma}}\right\}$$

$\tau$ being the detection threshold value, brought back to a pixel-homogeneous quantity,
N being the number of points of interest detected for a threshold $\tau$, and
C and $\sigma$ being said parameterization values linked to the current image.

In a particular implementation of the invention, the step a) of determining, for a current image, the parameterization values of the exponential function comprises the following sub-steps:

a1) a first search for points of interest in the current image by the search algorithm with a first predetermined value of the detection threshold, giving for result a first number of points of interest;
a2) at least one second search for points of interest in the current image by the search algorithm with a second value of the detection threshold higher than the first predetermined value of the detection threshold, giving for result a second number of points of interest; and
a3) the determination of the parameterization values C and $\sigma$ based on the number of points of interest obtained at steps a1) and a2).

The method can advantageously comprise, during the iterative execution of the steps a) and b):
the application of camera auto-exposure information as supplementary input data for the prediction of the detection threshold.

According to another particularly advantageous aspect of the invention, the method further comprises:

the division of the current image into a plurality of reduced-size sub-images;
the execution of steps a) and b) independently for the different sub-images of the current image, with, for result, an optimum value of detection threshold peculiar to each sub-image; and
the execution of step c) with application, for each sub-image of the following image, of the point of interest search algorithm with the respective optimum detection threshold value peculiar to this sub-image. The optimum detection threshold value can in particular be a value corresponding to a same predetermined number of points of interest for all the sub-images.

In a particular implementation of this second aspect of the invention, the method comprises:

previously to step a), the production of a multiresolution representation of the pyramid-of-images type, modelling the current image of the scene picked up at different successively increasing resolutions; and
the iterative execution of steps a) and b) for each level of the multiresolution representation, starting by the level of less resolution, the detection threshold value determined for a given level being applied as an input data for the prediction of the detection threshold at the higher level of resolution.

According to various other advantageous aspects of this second aspect:

the execution of the step c) comprises the application, for each level of the multiresolution representation of the following image, of the point of interest search algorithm with the respective optimum detection threshold value peculiar to this level;
the iterative execution of steps a) and b) comprises, for each level of the multiresolution representation, the application, as complementary input data for the prediction of the detection threshold at the higher resolution level, of the optimum thresholds and the applied thresholds corresponding to the lower levels of resolution and/or of camera auto-exposure information;
the method further comprises: the division of the images at the different levels of the pyramid of images into a plurality of reduced-size sub-images; the execution of steps a) and b) independently for the different sub-images, with for result an optimum detection threshold value peculiar to each sub-image; and the execution of the step c) with application, for each sub-image of the following image, of the point of interest search algorithm with the respective optimum detection threshold value peculiar to this sub-image. The optimum detection threshold value can in particular be a value corresponding to a same predetermined number of points of interest for all the sub-images.

An exemplary embodiment of the invention will now be described, with reference to the appended drawings in which the same reference denote identical or functionally similar elements throughout the figures.

FIG. 1 schematically illustrates the context of the point of interest detection and the chaining of the different processings.

Figure 1:
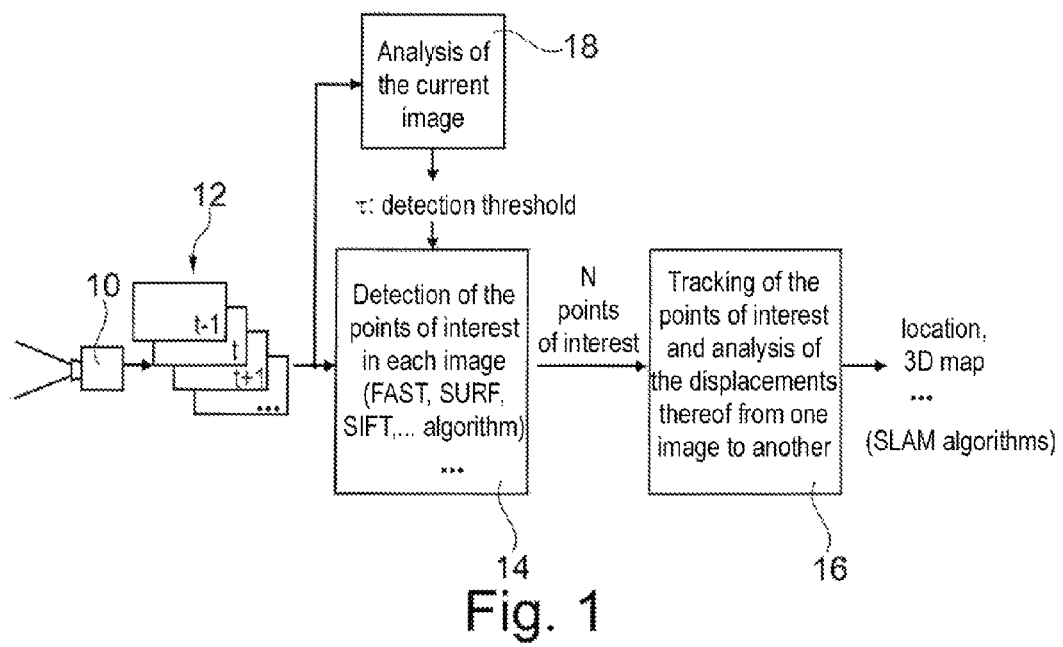

In FIG. 1, the reference 10 denotes a cameral picking up a scene and delivering a sequence of digital images 12 at instants t−1, t, t+1 . . . . Each of these images is subjected to a processing by a point of interest detection algorithm 14, which receives as an input the pixels of the current image and delivers as an output data of identification of points of interest, these points of interest being N in number.

The N points of interest delivered as an output by detection algorithm 14 are applied at the input of an analysis algorithm 16, which will study the displacements of the points of interest (tracking) on the successive images, so as to produce data of location (based on the displacement of the camera) and of construction of a map of these displacements, stored in a memory, for example to reconstruct a three-dimension mesh of the passed-through space, added therein elements of augmented reality, etc. These algorithms 16, which are typically algorithms of the SLAM (Simultaneous Localization And Mapping) type do not belong to the invention, which relates only to the preliminary detection of the points of interest (block 14).

The algorithm 14 is parameterized by a detection threshold τ, which allows to adjust the sensitivity of the algorithm. It is a parameter present in a great number of points of interest detection algorithms.

Figure 2:
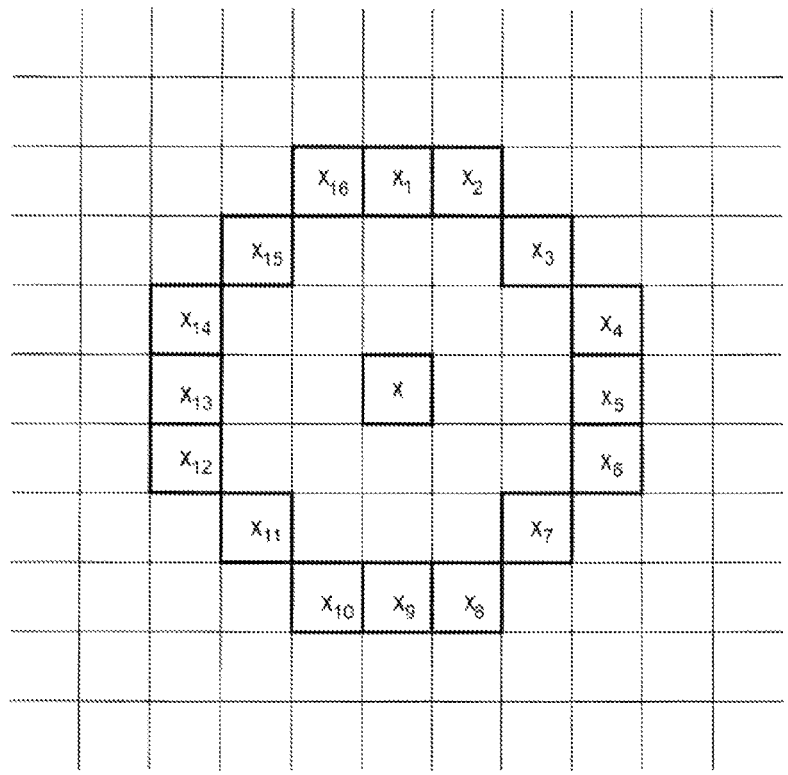
FIG. 2 shows a pixel with the surrounding thereof, to illustrate a technique of detection of the points of interest.

If the FAST algorithm is taken as an example (not limitative), and with reference to FIG. 2, this algorithm performs, for each pixel x of the image, an analysis of the pixels $\{x_1, \ldots, x_{16}\}$ located approximately on a circle surrounding the considered pixel x.

The following decision function is used, for each position p of analysed pixel x:

$$S_p(x_i) = \begin{cases} d, & I(x_i) \leq I(p) - \tau \\ s, & I(p) - \tau < I(x_i) < I(p) + \tau \\ b, & I(p) + \tau \leq I(x_i) \end{cases}$$

The detection threshold τ allows to adjust the discrimination threshold for determining if the brightness $I(x_i)$ of the pixel $x_i$ of the considered surrounding is significantly higher than (b), lower than (d) or similar to (s) the brightness I(p) of the considered central pixel x. It is considered that we are in presence of a point of interest if a contiguous number m≥M (for example M=9) of pixels of the set $\{x_1, \ldots, x_{16}\}$ are of type d or b.

As will be easily understood, with such a FAST algorithm (and, likewise with other detection algorithms such as SURF, SIFT . . . ), for a given threshold τ, a greater number N of points of interest will be obtained with a strongly contrasted image than with a homogeneous image, wherein these variations can be typically in a ratio of the order of one to ten.

Over an heterogeneous sequence of images, the number N will be able to vary in a very significant manner from one image to the following one (time instability), as well as between different areas of a same current image (space instability).

Figure 3:
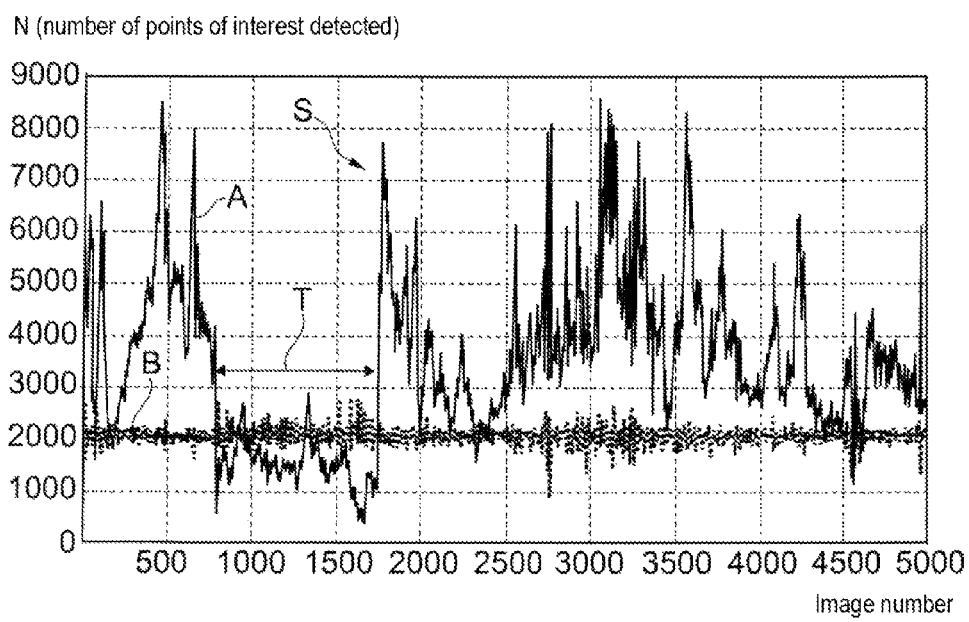
FIG. 3 is a survey giving the number of detected points of interest for an example of sequence of images, in the case of a conventional technique and with the technique according to the invention.

In FIG. 3, the characteristic A illustrates an example of variation of the number N of points of interest detected by a conventional algorithm of the FAST type, for a sequence of images picked up by the front camera of a car in displacement in a urban environment: in certain cases, the number N of detected points of interest can reach, or even exceed, 7000 to 8000 points of interest, whereas in other cases (for example, the region T corresponding to the passing through a tunnel), this number can decrease suddenly under 2000 points of interest, or even less than 1000 points of interest, to then increase suddenly at the exit of the tunnel (area S) to values of 7000 to 8000 points of interest.

As explained in introduction, these extreme variations of the number of detected points of interest degrade considerably the whole performances of the algorithms operating downstream (block 16 in FIG. 1) and occupy uselessly important computing resources.

The technique of the invention consists in dynamically and adaptively modifying the detection threshold τ, by analysing the current image (block 18) and applying the thus-determined threshold τ to the detection of the points of interest in the following image (block 14).

The algorithm of the invention is based on a modelling of the characteristic giving the number N of detected points of interest as a function of the threshold τ.

Characteristically, this modelling is performed by a decreasing exponential function, in particular a square root function of the form:

$$N(\tau) = C \exp\left\{-\sqrt{\frac{\tau}{\sigma}}\right\}$$

τ being the detection threshold value, brought back to a pixel-homogeneous quantity: indeed, according to the detectors the conventionally defined threshold may be a quantity homogeneous to the square pixel (for example, for a SURF detector), or even to the pixel at the fourth power (Harris detector). In this case, the threshold must first be brought back to a pixel-homogeneous quantity or, equivalently, the above-mentioned function must be modified, for example by replacement of the "square root" function by the "fourth root" function, for a SURF detector.

It will be noted that this model requires only the determination of two parameters (C and σ) and that it is hence possible to operate a fast and simple interpolation of the function based on two measurements only, i.e. two iterations of the point of interest detection algorithm.

Figure 4:
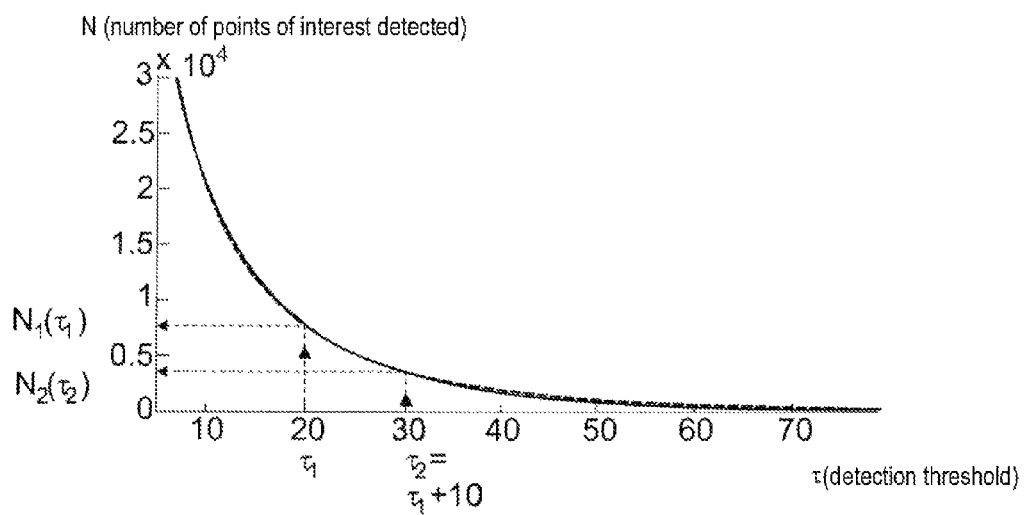
FIG. 4 illustrates the decreasing exponential model used according to the invention to link the number of detected points of interest to the detection threshold of the algorithm.

The above-mentioned decreasing exponential function N(τ) is graphically shown in FIG. 4.

Advantageously, a first detection of the points of interest in the current image is operated for a threshold $\tau_1$, for example $\tau_1=20$, giving a number $N_1$ of points of interest. The following iteration is operated with a threshold $\tau_2$, giving a second number $N_2$ of points of interest. Very advantageously, the threshold $\tau_2$ is higher than the threshold $\tau_1$, which allows to reduce the second search for points of interest to only the points of interest ($N_1$ in number) already determined by the first iteration.

Preferably, the second threshold $\tau_2$ is offset from the first threshold $\tau_1$ by a constant value, for example $\tau_2=\tau_1+10$, by a value guarantying a robust and fast interpolation.

As a variant, the increment between $\tau_1$ and $\tau_2$ may be dynamically modified as a function of the estimated curvature of the characteristic, which will provide a marginal gain.

Based on the two values $N_1$ and $N_2$ obtained, the parameters σ and C of the characteristic can be easily determined:

$$\begin{cases} \sigma = \dfrac{(\sqrt{\tau_1} - \sqrt{\tau_2})^2}{\ln^2(N_1/N_2)} \\ C = N_1 \exp\left\{\sqrt{\dfrac{\tau_1}{\sigma}}\right\} \end{cases}$$

The process can possibly be improved by performing a third (or even more) search for determining with a better accuracy the parameters σ and C of the characteristic, with a number of points of interest higher than two. The function N(τ) will be able to be so parameterized for the current image. As a function of the ideal number $\hat{N}$ of points of interest that is desired to be obtained during the analysis of the following image, the corresponding ideal threshold $\hat{\tau}$ will be given by:

$$\hat{\tau} = \sigma \ln^2 \frac{C}{\hat{N}}$$

The result obtained over the successive images of the sequence picked up by the camera is illustrated in B in FIG. 3: as can be seen, the real number N of detected points of interest remains extremely close to the ideal number $\hat{N}$, herein fixed to $\hat{N}=2000$ points of interest, and this even for an extremely heterogeneous sequence of images. This result is to be compared with the number N obtained with the conventional techniques (curve A) for the same sequence of picked-up images, a number that was able to vary in considerable proportions, typically from less than 1000 to more than 8000 points of interest according to the images.

An improvement of the invention consists in operating a prediction of the optimum detection threshold not only from one image to the following one, but also, within a same image, on different successively increasing resolutions of the same image.

Figure 5:
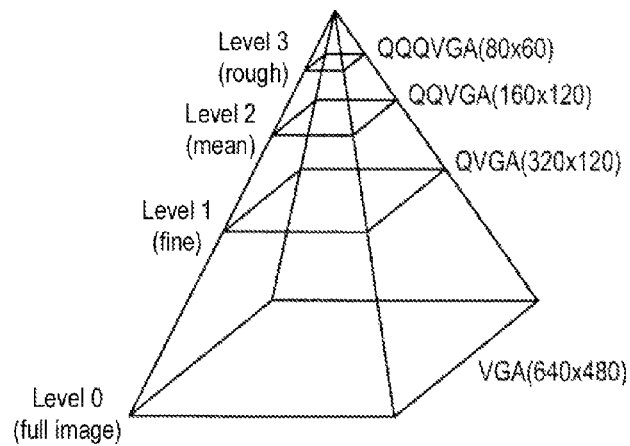
FIG. 5 is an illustration of the multiresolution representation of the pyramid-of-images type, for a same current image considered at different resolutions.

For that purpose, the algorithm uses, as illustrated in FIG. 5, a multiresolution representation of the current image of the "pyramid-of-images" type. The general principle of the pyramid of images is for example disclosed in:

[6] G. Klein and D. W. Murray, "Parallel Tracking and Mapping for Small AR Workspaces," *ISMAR*, 2007.

In the present case, resolutions are for example chosen, with successive scales in a linear ratio of each times 1:2, with:
  initial level (full image) VGA (640×480);
  level 1 (reduced but fine resolution) QVGA (320×120);
  level 2 (mean resolution) QQVGA (160×120); and
  level 3 (the roughest resolution) QQQVGA (80×60).

This example if of course not limitative, and it should be possible to operate starting for example with a HD 720p resolution.

The multiresolution representation allows in particular to take into account the erratic impact of the systems for the automatic exposure adjustment of the cameras used.

Indeed, a modification of the exposure may easily lead to a variation from the simple to the double of the number of detected points of interest even as, visually, the two successive images are absolutely similar and correspond approximately to the same picked up scene. This phenomenon introduces a significant dynamic effect to which the algorithms of the FAST type are particularly sensitive, insofar as when they do not perform a normalisation as a function of the contrast.

The pyramidal multiresolution representation allows to adapt the prediction of the threshold by taking into account that the effects such as the automatic exposure adjustments produce identical consequences on each level of the pyramid.

More precisely, the algorithm uses the properties of the image at a rough scale as a predictor for these same properties at finer scales (inter-scale link), and the properties of the image at a given scale for the current image will be used as a predictor for the same properties in the following image, at the same scale (inter-images scale). The variations at the rough scales will be able to be very rapidly integrated in the prediction for the later levels of the pyramid.

Figure 6:
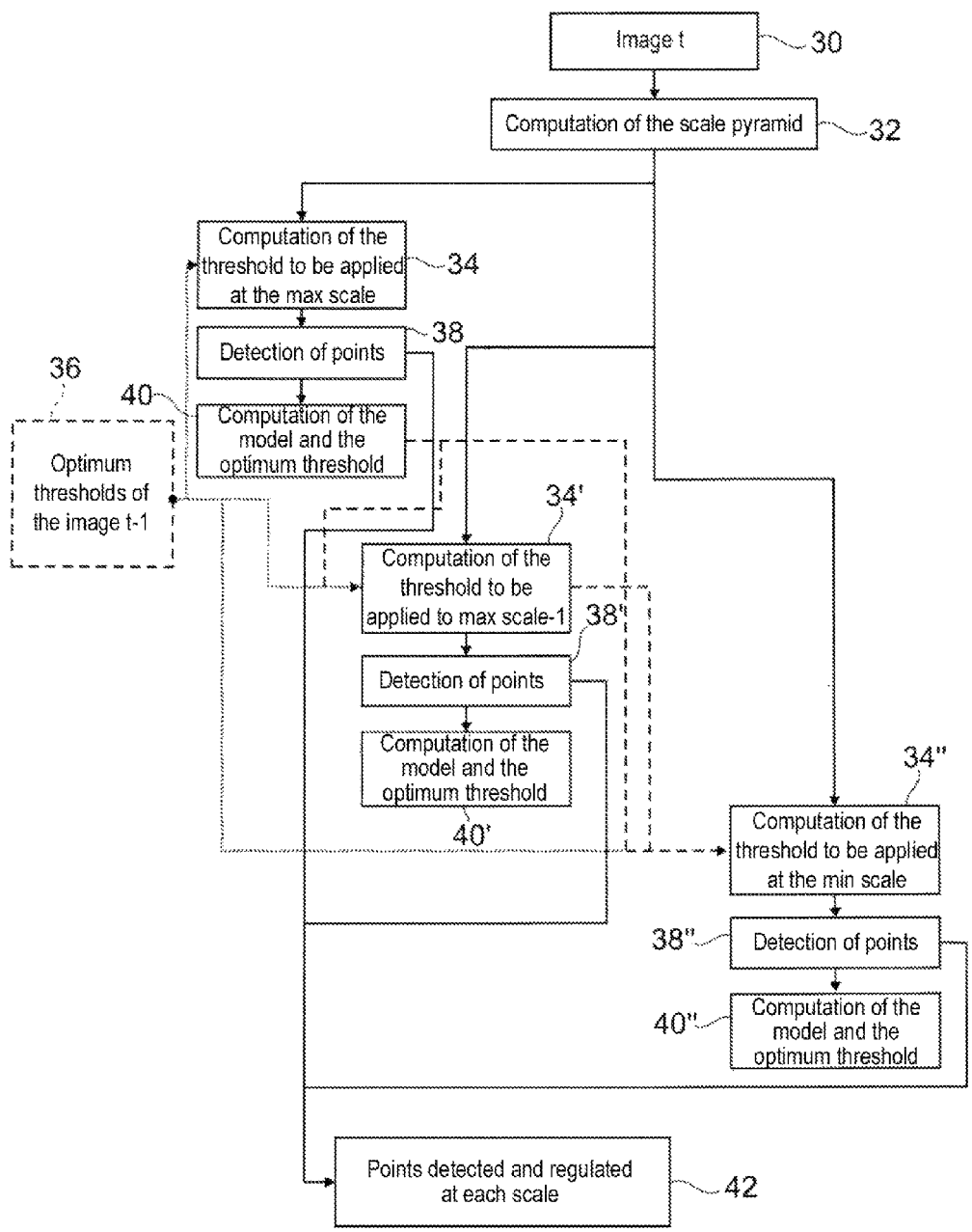
FIG. 6 illustrates, as a block diagram, the chaining of the different steps of the point of interest detection with a multi-resolution approach.

This step chaining is detailed in FIG. 6: after acquisition of the image (block 30) and computation of the scale pyramid (block 32), the algorithm computes (block 34) the threshold to be applied at the maximum scale (the roughest) based on the previously determined optimum threshold value, for this same scale, at the previous image (block 36). The detection of the points of interest is then carried out (block 38) with this detection threshold value, hence allowing to compute the parameters C and σ of the exponential model and hence to determine the optimum threshold τ for the current image (block 40).

These operations are reiterated at the lower level scale (blocks 34', 38', 40') based on i) the threshold value determined for this same level on the previous image (block 36) and ii) the optimum threshold value that has just been determined (block 40) for the current image at the just higher scale.

These computations are reiterated for the successive levels of the pyramid, to the lowest level (blocks 34", 38", 40"), hence giving the optimum number of points of interest detected and regulated for each scale (block 42).

Generally, for the image t at the scale k, the threshold to be applied is searched for as a function of the optimum threshold of this same scale k of the previous image t−1 and of the couples {optimum threshold, applied threshold} of the current image t at the higher scales q>k:

$$s_t^k = f(\hat{s}_{t-1}^k, (\hat{s}_t^q, s_t^q)_{q>k})$$

where:
  the index t denotes the image number,
  the exponent k denotes the scale, $s_t^k$ denotes the threshold applied for the image of index t at the scale k, and $\hat{s}_t^k$ denotes the optimum threshold for the image of index t at the scale k.

For example, the function $f$ may be (with $\lambda_q^k$ to be determined):

$$s_t^k = \hat{s}_{t-1}^k + \sum_{q>k} \lambda_q^k (\hat{s}_t^q - s_t^q)$$

or:

$$s_t^k = \hat{s}_{t-1}^k \frac{s_t^{k+1}}{\hat{s}_t^{k+1}}$$

As a variant, it could be possible to use the parameters of adjustment of the camera (auto-exposure, white balance . . . ) at the image t, noted $p_t$:

$$s_t^k = f(\hat{s}_{t-1}^k, p_t)$$

Figure 7:
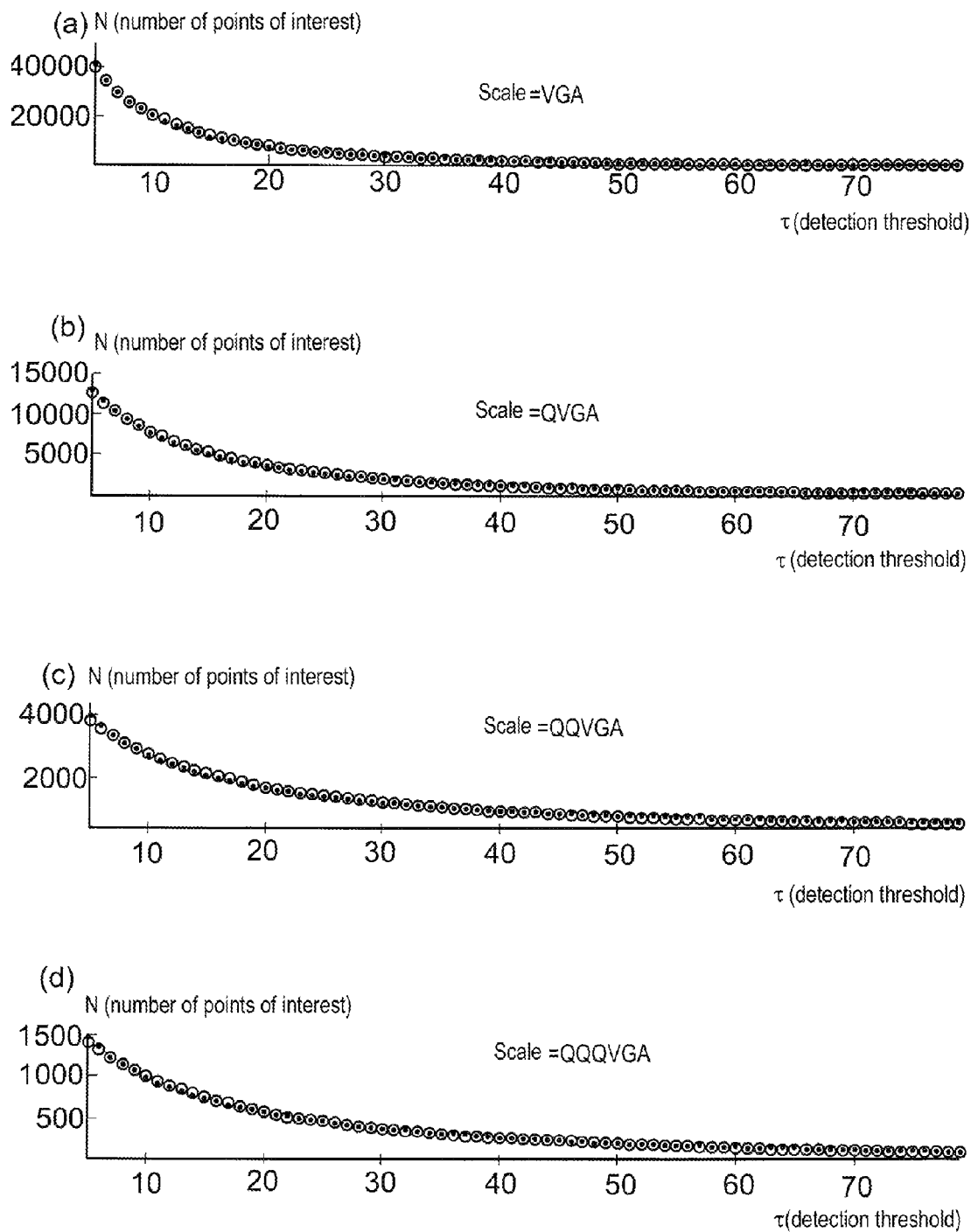
FIG. 7 illustrates the characteristic giving, at different scales of resolution, the number of points of interest as a function of the detection threshold, both for the theoretical model and for the real data.

FIG. 7 gives an example of characteristics N(τ) for the successive scales VGA . . . QQQVGA (characteristics (a) to (d), respectively), the points indicating the values computed by modelling and the circles indicating the real data, which allows to observe an excellent correspondence between the model and the reality for the four scales of a same image.

Figure 8:
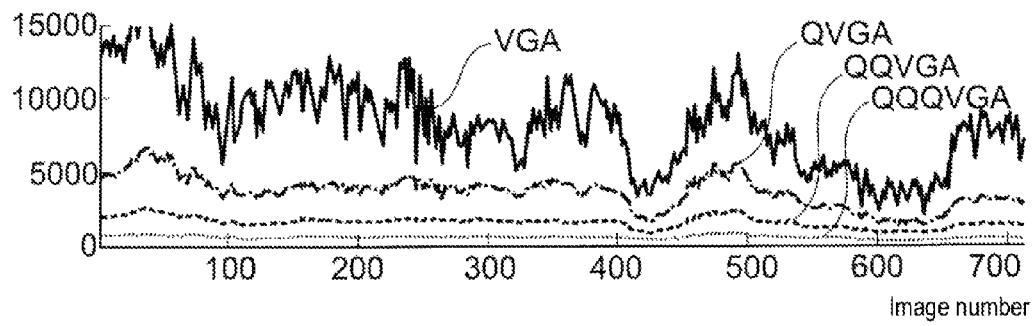
FIG. 8 illustrates the variations of the number of points of interest, for several levels of resolution, respectively for a conventional technique, for a technique according to the invention with time prediction only and for a technique according to the invention with both time and space prediction.
Figure 8:
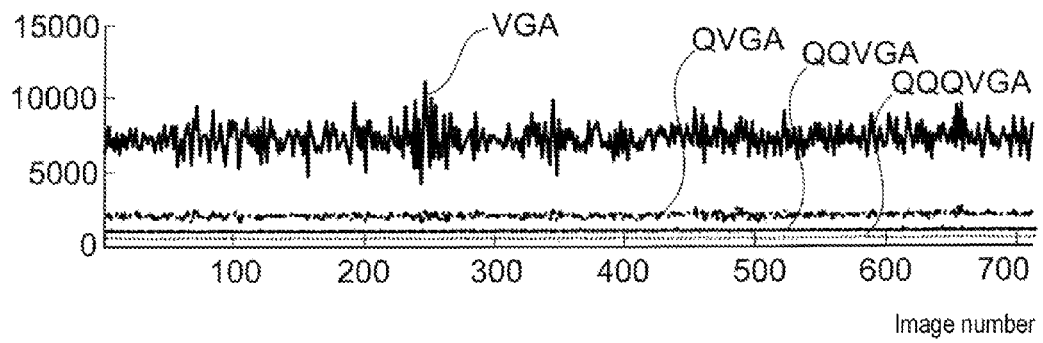
Figure 8:
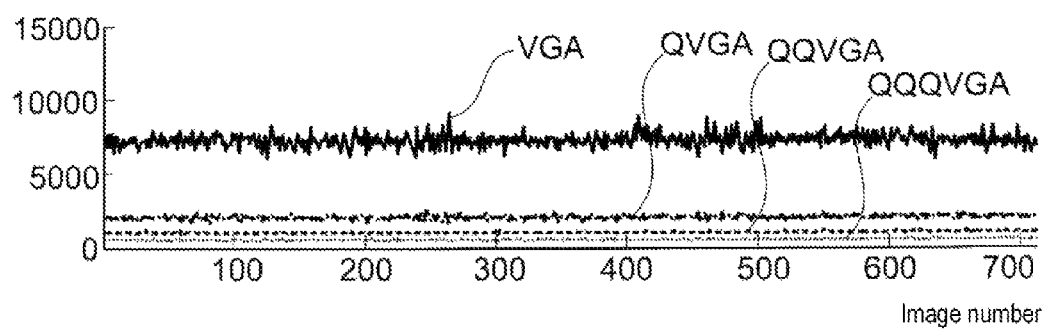

In FIG. 8 are illustrated, for a sequence of images, the variations of the number N of points of interest detected at the different resolutions VGA . . . QQQVGA, in the following conditions:
   in (a), for a constant threshold fixed to τ=20, hence corresponding to a FAST algorithm of conventional type;
   in (b), with inter-image prediction of the detection threshold (time prediction), according to the invention;
   in (c), according to the same technique as in (b), but with further application of a multiresolution representation and of an inter-scale prediction (space prediction) as exposed hereinabove with reference to FIG. 6.

Figure 9:
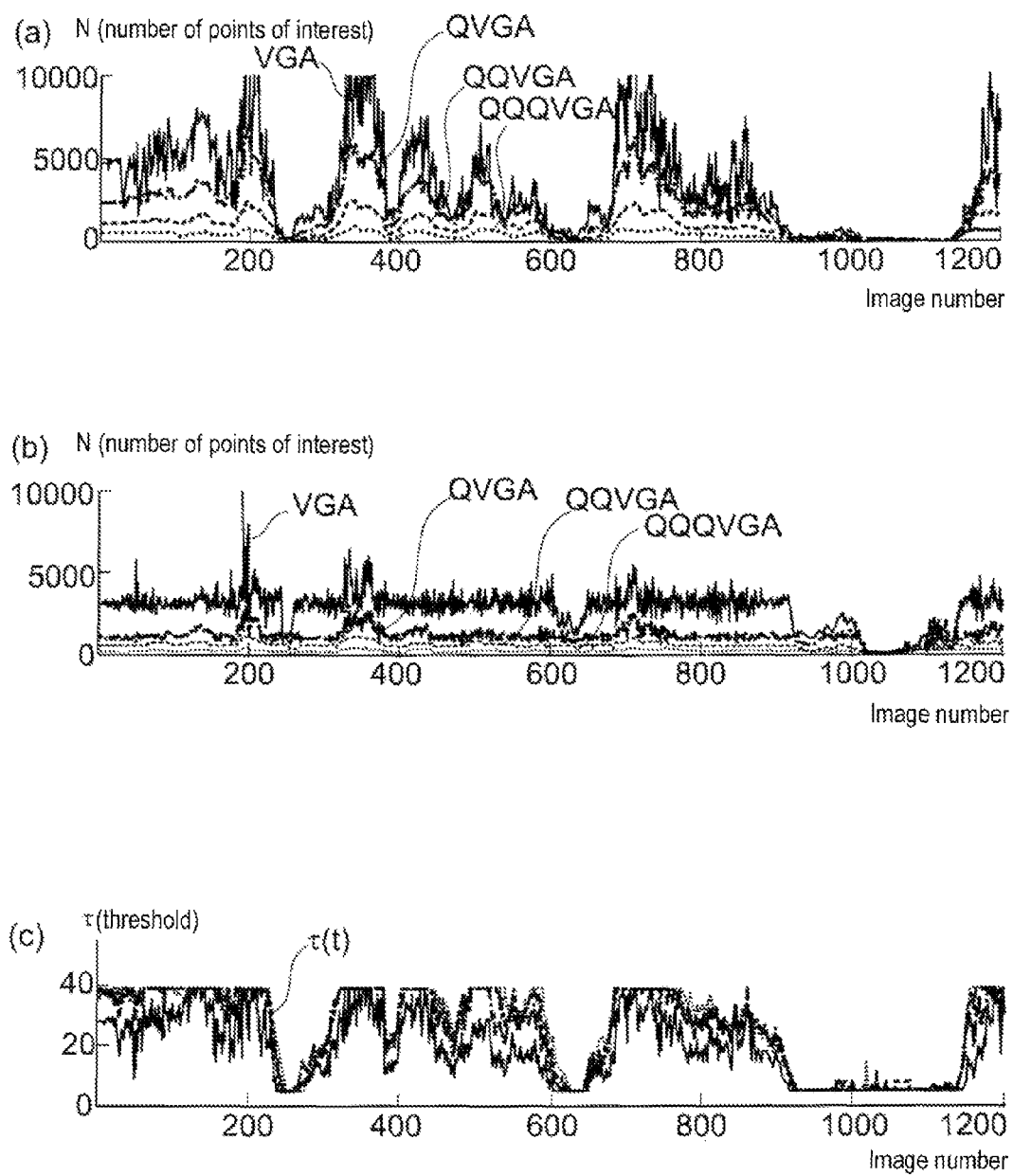
FIG. 9 illustrates, for different levels of resolution of the image, the variations of the number of detected points of interest respectively for a conventional technique with a constant threshold and for a technique according to the invention, as well as the corresponding observed variations of the detection threshold in this later case.

FIG. 9 is a comparable representation giving:
   in (a): the variations of the number N of points of interest detected at the different resolutions VGA . . . QQQVGA by a conventional technique, with a constant threshold τ=25;
   in (b): these same variations of the number of points of interest, detected by a technique according to the invention, by application as a detection threshold of the optimum value computed for the previous image; and
   in (c), the instantaneous variations, image per image, of the corresponding threshold τ.

Finally, to compensate for the problem of space instability mentioned in introduction, the technique of the invention lends itself very well to the application of a bucketing technique, consisting in dividing the current image into a plurality of independent sub-images of reduced size, and in applying the point of interest detection algorithm independently to the different sub-images.

The principles of the bucketing are for example described in:

[7] R. Voigt, J. Nikolic, C. Hurzeler, S. Weiss, L. Kneip, and R. Siegwart, "Robust Embedded Egomotion Estimation", 2011 *IEEE/RSJ International Conference on Intelligent Robots and Systems (IROS)*, 2011, pp. 2694-2699.

[8] B. Kitt, A. Geiger, and H. Lategahn, "Visual Odometry Based on Stereo Image Sequences with Ransac-Based Outlier Rejection Scheme", 2010 *IEEE Intelligent Vehicles (IV) Symposium*, June 2010, pp. 486-492.

Figure 10:
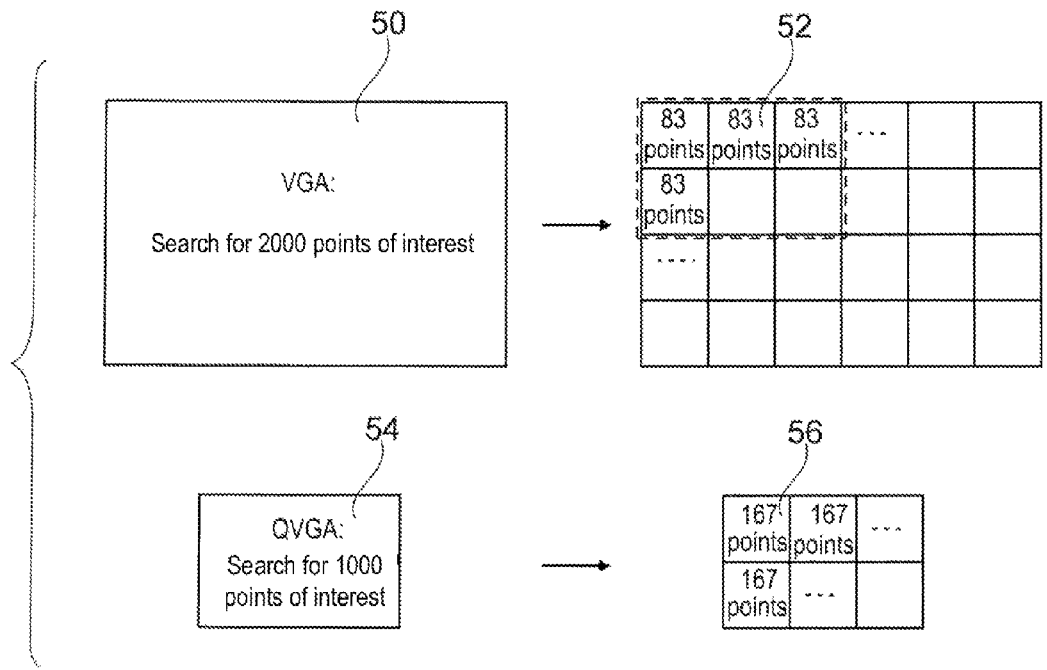
FIG. 10 illustrates an improvement according to a bucketing technique consisting in dividing the image into a plurality of areas to which the algorithm of the invention is independently applied for each area.

Hence, as illustrated in FIG. 10, instead of searching for example for 2000 points of interest on the full image 50 in VGA resolution, this image is divided into 6×4 sub-images 52 and 2000/(6×4)~83 points of interest are searched for in each sub-image.

Likewise, instead of searching for 1000 points of interest in an image 54 in QVGA resolution, this QVGA image is divided into 3×2 sub-images 56 and 167 points of interest of each sub-image are searched for.

The thresholds predicted and used will be different for each sub-image and for each resolution (by applying the above-mentioned technique of scale pyramid).

More precisely, in the inter-resolution relation, the result obtained at scale L−1 will be used in the corresponding sub-image, for example the four sub-images 52 framed by dashed lines of the VGA resolution will use the sub-image 56 in the top left of the QVGA scale for the threshold computation.

It will be noted that the integration of a bucketing in the detection of the points of interest with the algorithm of the invention is performed with no significant additional cost in terms of computation time and computer resources, which allows in other terms to guarantee with no additional cost an optimized distribution of the points of interest in the different regions of the image, hence allowing to solve the problem of space instability mentioned in introduction, met with the conventional point of interest detection algorithms.

The invention claimed is:

1. A method of detection of points of interest in a digital image of a sequence of images (12) of a scene picked up by a camera (10), this method implementing an point of interest search algorithm (14) that is parameterizable with a detection threshold (τ) such that the number (N) of points of interest detected in the image varies as a function of the threshold level, this method being characterized by a modeling by a decreasing exponential function of the characteristic giving the number (N) of detected points of interest as a function of the threshold (τ), this exponential function being dynamically parameterizable with values (C, σ) linked to an image to be analysed, and in that it comprises the following steps:

a) determining (18), for a current image, values of parameterization (C, σ) of the decreasing exponential function;

b) predicting (18), for said current image, an optimum value of the detection threshold (τ) by using the modelled characteristic, parameterized with the values determined at step a); and c) applying (14), for at least one image following said current image, the point of interest search algorithm with the optimum detection threshold value (τ) computed at step b).

2. The method of claim 1, wherein said optimum detection threshold value (τ) predicted at step b) is a value corresponding to a given number (N) of points of interest, as indicated by said characteristic giving the number of points of interest detected as a function of the threshold.

3. The method of claim 1, wherein said decreasing exponential function is a square root decreasing exponential function:

$$N(\tau) = C \exp\left\{-\sqrt{\frac{\tau}{\sigma}}\right\}$$

τ being the detection threshold value, brought back to a pixel-homogeneous quantity, N being the number of points of interest detected for a threshold τ, and C and σ being said parameterization values linked to the current image.

4. The method of claim 1, wherein the step a) of determining, for a current image, the parameterization values of the exponential function comprises the following sub-steps:

a1) a first search for points of interest in the current image by the search algorithm (14) with a first predetermined value ($\tau_1$) of the detection threshold, giving for result a first number of points of interest ($N_1$);

a2) at least one second search for points of interest in the current image by the search algorithm (14) with a second value ($\tau_2$) of the detection threshold higher than the first predetermined value ($\tau_1$) of the detection threshold, giving for result a second number of points of interest ($N_2$); and a3) the determination of the parameterization values C and a based on the number of points of interest ($N_1$, $N_2$) obtained at steps a1) and a2).

5. The method of claim 1, further comprising, during the iterative execution of the steps a) and b):

the application of camera auto-exposure information as supplementary input data for the prediction of the detection threshold.

6. The method of claim 1, further comprising:

the division of the current image (50; 54) into a plurality of reduced-size sub-images (52; 56);

the execution of steps a) and b) independently for the different sub-images of the current image, with, for result, an optimum value of detection threshold peculiar to each sub-image; and the execution of step c) with application, for each sub-image of the following image, of the point of interest search algorithm with the respective optimum detection threshold value peculiar to this sub-image.

7. The method of claim 6, wherein the optimum detection threshold value is a value corresponding to a same predetermined number of points of interest for all the sub-images.

8. The method of claim 1, further comprising:

previously to step a), the production (30, 32) of a multiresolution representation of the pyramid-of-images type, modelling the current image of the scene picked up at different successively increasing resolutions (QQQVGA, QQVGA, QVGA, VGA); and the iterative execution of steps a) and b) for each level of the multiresolution representation (34, 38, 40), starting by the level of less resolution (QQQVGA), the detection threshold value determined for a given level being applied as an input data for the prediction of the detection threshold at the higher level of resolution the iterative execution of steps a) and b) for each level of the multiresolution representation (34, 38, 40), starting by the level of less resolution (QQQVGA), the determined detection threshold value for a given level being applied as an input data for the prediction of the detection threshold at the higher level of resolution.

9. The method of claim 8, further comprising:

the execution of the step c) with the application, for each level of the multiresolution representation of the following image, of the point of interest search algorithm with the respective optimum detection threshold value peculiar to this level.

10. The method of claim 8, further comprising, during the iterative execution of steps a) and b), for each level of the multiresolution representation:

the application, as complementary input data for the prediction of the detection threshold at the higher resolution level, of the optimum thresholds and the applied thresholds corresponding to the lower levels of resolution.

11. The method of claim 8, further comprising, during the iterative execution of steps a) and b), for each level of the multiresolution representation:

the application, as complementary input data for the prediction of the detection threshold at the higher resolution level, of camera auto-exposure information.

12. The method of claim 8, further comprising:

the division of the images at the different levels of the pyramid of images (50; 54) into a plurality of reduced-size sub-images (52; 56);

the execution of steps a) and b) independently for the different sub-images, with for result an optimum detection threshold value peculiar to each sub-image; and the execution of the step c) with application, for each sub-image of the following image, of the point of interest search algorithm with the respective optimum detection threshold value peculiar to this sub-image.

13. The method of claim 12, wherein the optimum detection threshold value is a value corresponding to a same predetermined number of points of interest for all the sub-images.

* * * * *